(No Model.)

J. W. DOUGLAS.
CUTTER AND HOLDER FOR LATHES, &c.

No. 280,148. Patented June 26, 1883.

Witnesses:
Jas. E. Hutchinson.
J. A. Rutherford.

Inventor.
Jos. W. Douglas,
By James L. Norris,
Att'y.

UNITED STATES PATENT OFFICE.

JOSEPH W. DOUGLAS, OF MIDDLETOWN, CONNECTICUT.

CUTTER AND HOLDER FOR LATHES, &c.

SPECIFICATION forming part of Letters Patent No. 280,148, dated June 26, 1883.

Application filed March 24, 1883. (No model.)

*To all whom it may concern:*

Be it known that I, JOSEPH W. DOUGLAS, a citizen of the United States, residing at Middletown, in the county of Middlesex and State of Connecticut, have invented new and useful Improvements in Cutters and Holders for Lathes, Planers, and Similar Machines, of which the following is a specification.

This invention relates to improvements in circular notched cutters for planers, lathes, and similar machines, and has for its object to provide novel and efficient means for connecting and rigidly locking together the cutter and its holding-bar, while permitting the cutter to be conveniently adjusted, when its cutting-bit becomes worn, in such manner that when the cutter is properly adjusted to the desired position it will be impossible to rotate or move the cutter by the action of the revolving or moving work on its cutting-bit.

The object of my invention I accomplish in the manner and by the means hereinafter described and claimed, and illustrated in the accompanying drawings, in which—

Figure 1:
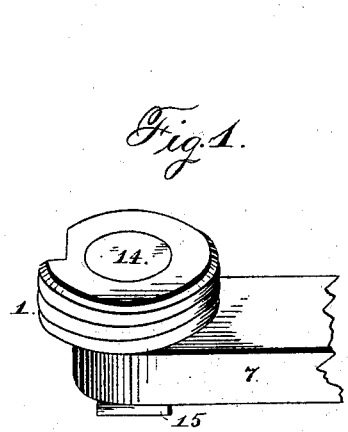
Figure 2:
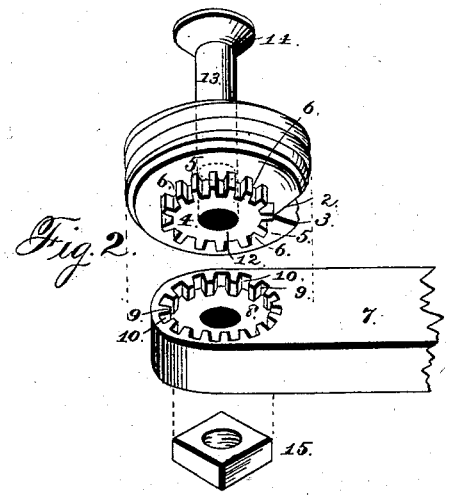
Figure 3:
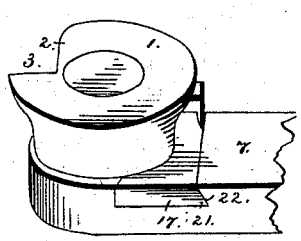

Figure 1 is a perspective view of a cutter embodying my invention; Fig. 2, perspective views of the parts detached; Fig. 3, a perspective view, showing a modification of my invention; and Fig. 4, detached perspective views of the parts shown in Fig. 3.

The circular cutter No. 1 is provided with a transverse notch or recess, 2, to form the cutting-bit 3, and the periphery of the cutter is constructed to produce any form of cut that may be desired—such, for example, as with threads to form screw-threads, or with a single annularly-projecting cutter to form a groove or slot, or with a cutting-face, to shave, plane, or turn.

Referring to Figs. 1 and 2, the circular cutter 1 is provided at one side with a circular projecting hub or boss, 4, constructed with a peripheral series of spaced teeth—that is, alternating projections 5 and recesses 6—which in general appearance is that of a gear-wheel, and the holding-bar 7 is constructed at one end with a circular socket, 8, the surrounding wall of which is provided with an annular series of alternating teeth or projections, 9, and spaces 10, corresponding in size and number to the teeth and projections on the hub or boss of the cutter.

The cutter is provided with a conical socket, 11, in its outer side, and an orifice, 12, for the reception of the bolt 13 and its conical head 14, said bolt passing through an orifice in the holding-bar and having a screw-threaded end, to which is applied a nut, 15.

By adjusting the cutter so that its peripherally-notched hub or boss enters the socket in the holding-bar and the respective teeth or projections slip by each other, so as to interlock, and then screwing up the nut, to cause the bolt to clamp and hold the hub or boss of the cutter within the socket, it will be obvious that the cutter cannot rotate or move when acting upon the revolving or moving work, but will be rigidly locked to the holding-bar and be incapable of movement thereon, unless intentionally adjusted, when such becomes necessary, owing to the wear of the cutting-bit. As the cutting-bit becomes worn, the parts can be loosened, the cutter moved laterally, to disengage its locking-teeth from the teeth in the socket of the bar, and then adjusted to the required extent, the parts being afterward interlocked and confined by screwing up the nut.

Figure 4:
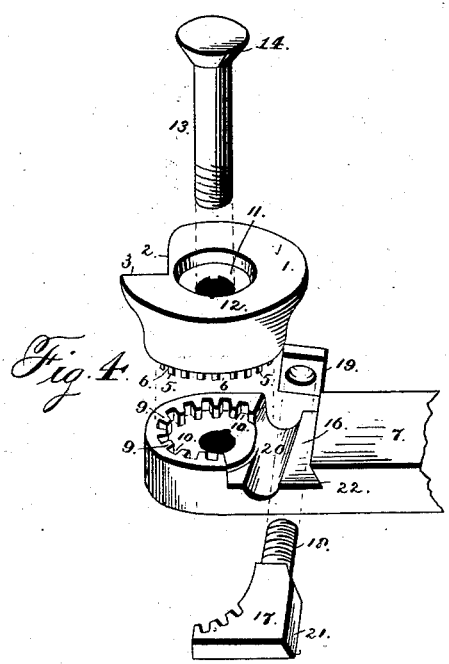

In the modification shown in Figs. 3 and 4 the holding-bar is transversely grooved to form a seat, 16, for a locking-slide, 17, which is provided with spaced teeth, which in position form, as it were, a continuation of those teeth in the socket 8. The slide is constructed with a screw-threaded stem, 18, projecting through the bar to receive a nut, 19, for holding the teeth of the slide in engagement with the peripheral toothed or notched hub or boss of the cutter. The transverse groove of the bar is provided with a semicircular depression, 20, for the convenient insertion and removal of the slide, and said slide is provided at its rear edge with an incline, 21, which interlocks with an inclined shoulder, 22, at the rear of the groove in the holding-bar, for the purpose of preventing the slide from moving laterally. By the construction described the cutter can be rigidly locked to its holding-bar, while it is capable of being conveniently adjusted on its axis when the cutting-bit wears away.

Having thus described my invention, what I claim is—

1. The combination of the circular notched cutter having at one side a series of spaced teeth, a holding-bar having spaced teeth, and means for holding the respective teeth in engagement, substantially as described.

2. The combination of a circular notched cutter having at one side a hub or boss provided with a peripheral series of spaced teeth, with the holding-bar having a socket to receive the hub or boss of the cutter, and the surrounding wall of which is toothed or notched to engage the teeth of the cutter, substantially as described.

3. The combination of a circular notched cutter having at one side a hub or boss provided with a peripheral series of spaced teeth, a holding-bar having a socket to receive the hub or boss of the cutter, and the wall of which is provided with spaced teeth and a clamping-bolt and nut for holding the hub or boss in the socket and the respective teeth in engagement, substantially as described.

In testimony whereof I have hereunto set my hand in the presence of two subscribing witnesses.

JOS. W. DOUGLAS.

Witnesses:
  JOHN N. CAMP,
  E. G. CAMP.